(12) United States Patent
Dykema

(10) Patent No.: US 6,640,485 B1
(45) Date of Patent: Nov. 4, 2003

(54) FISHING LURE

(76) Inventor: Matthew W. Dykema, 1547 W. 3$^{rd}$ St., Pella, IA (US) 50219

( * ) Notice: Subject to any disclaimer, the term of this patent is extended or adjusted under 35 U.S.C. 154(b) by 0 days.

(21) Appl. No.: 10/108,102

(22) Filed: Mar. 27, 2002

(51) Int. Cl.$^7$ ............................................... A01K 85/00
(52) U.S. Cl. ..................................................... 43/42.11
(58) Field of Search ............................ 43/42.11, 42.19, 43/42.21, 42.35

(56) References Cited

U.S. PATENT DOCUMENTS

| | | | | | |
|---|---|---|---|---|---|
| 14,706 | A | * | 4/1856 | Buel | 43/44.2 |
| 2,501,103 | A | * | 3/1950 | Slater | 43/42.15 |
| 2,755,593 | A | * | 7/1956 | Thurman | 43/44.2 |
| 2,866,293 | A | * | 12/1958 | Dedrick | 43/43.13 |
| 3,670,446 | A | * | 6/1972 | Wheeler | 43/42.19 |
| 4,742,639 | A | * | 5/1988 | Gunn | 43/42.13 |

* cited by examiner

Primary Examiner—Charles T. Jordan
Assistant Examiner—Susan C. Alimenti
(74) Attorney, Agent, or Firm—Camille L. Urban; G. Brian Pingel

(57) ABSTRACT

A low surface area profile fishing lure made of a generally two-dimensional frame. The frame bounds an opening shaped like the body of a fish, a tail portion and an eye portion. A propeller-like member associated with the tail portion and secured by a tube-like element causes the lure to spin when it is retrieved. An aperture in the tail portion provides a way to attach a fish hook, with or without a fish attractant. The eye portion has at least one loop where a fishing line can be attached as can a fish hook, also with or without a fish attractant. The hook attached to the eye portion is stabilized by a flexible sleeve on which is affixed at least one artificial eye. In the preferred embodiment, the eye portion is located interiorly of said opening shaped like the body of a fish.

14 Claims, 2 Drawing Sheets

FISHING LURE

BACKGROUND OF THE INVENTION

1. Field of the Invention

The present invention relates in general to a fishing lure and more specifically to a generally two-dimensional, low surface area profile lure which is also relatively light creating ease in casting and in retrieval through the water.

2. Description of the Prior Art

It is known in the art to create fishing lures shaped like prey, often three-dimensional and solid like the prey. Some of these lures are made of wood, some of flat metal pieces shaped like prey with a slight twist to cause the lure to spin in the water. Some of these also have a propeller attached to create water splashing when the lure is retrieved across the top of the water.

The aforementioned versions of a lure, especially for large fish, are relatively bulky and heavy and can be difficult both to cast and to retrieve through the water due to the drag created by the combination of their bulk and cross-section. In addition, when a fish strikes the lure it will often bite a part of this lure which is solid, rather than strike the hook which represents only a small portion of the entire lure size. The same fish may not strike again at all and will be a loss to the fisherman.

The present invention differs from the prior art in that it is lighter and constructed in such a way as to be easier both to cast and retrieve. In addition, its design provides that a solid strike will be more likely to require the fish to bite the hook, rather than allowing the fish to bite the lure alone and become agitated and leave. This lure is sometimes equipped with a relatively small propeller with the objective of spinning the lure while being retrieved under water (rather than adding splash on top of the surface). The spinning of the lure provides a more realistic prey profile to the fish.

It is therefore one objective of the present invention to provide a fishing lure which can be cast and retrieved with ease;

It is a second objective of the present invention to provide a lure designed so that when a fish strikes it is more likely to bite the hook than the lure alone;

It is a third objective to provide a lure simply constructed and by inexpensive means and materials;

It is a fourth objective of this invention to provide a lure that is not only lightweight but elastically flexible and durable;

Finally, it is an objective of the present invention to provide a propeller-like attachment which will cause the lure to spin and move under water like live prey.

SUMMARY OF THE INVENTION

The present invention provides a fishing lure which includes a two-dimensional frame made of a wire-like material which provides a boundary for an opening in the shape of a fish body with an interior and an exterior, an eye portion, and a tail portion all constructed with the same wire-like material. The eye portion is located in the interior of the opening and includes at least one loop to which fishing line is attached, a hook may be attached, and to which an artificial eye may be attached or affixed. The tail portion, located exterior of the opening shaped like the fish body, provides a place for the attachment of a propeller-like member and an opening for another hook or for a fish attractant and hooks to be attached. The shape of the frame including the tail portion, the eye portion, and the openings are preferably formed in such a way as to present the profile of prey without appendages or protrusions not attributable to prey. In the preferred embodiment, the frame, eye portion, and tail portion are formed from one continuous section of the wire-like material with its ends affixed.

Some advantages of the present invention are its simple and low-cost construction and its design which offers only the profile of prey without extra appendages or angular edges not expected for prey;

Another advantage of the present invention is the ease with which this essentially two-dimensional and light lure can be cast and then retrieved under the water where it presents the illusion of a three-dimensional profile and shape and movement of prey;

An additional advantage of the present invention is the ease with which this lure regains its shape after especially strong strikes or possible entanglement;

Other advantages include the ability of the fisherman to attach other attractive lures to the present invention and the ease with which this lure can be manufactured in many variations of the same shape without the need for dyecutting or fabricating for each new shape. Another embodiment of the present invention with a relatively larger propeller-like member will splash across the top surface of the water if the fisherman so desires.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

DETAILED DESCRIPTION OF THE PREFERRED EMBODIMENT(S)

Figure 1:
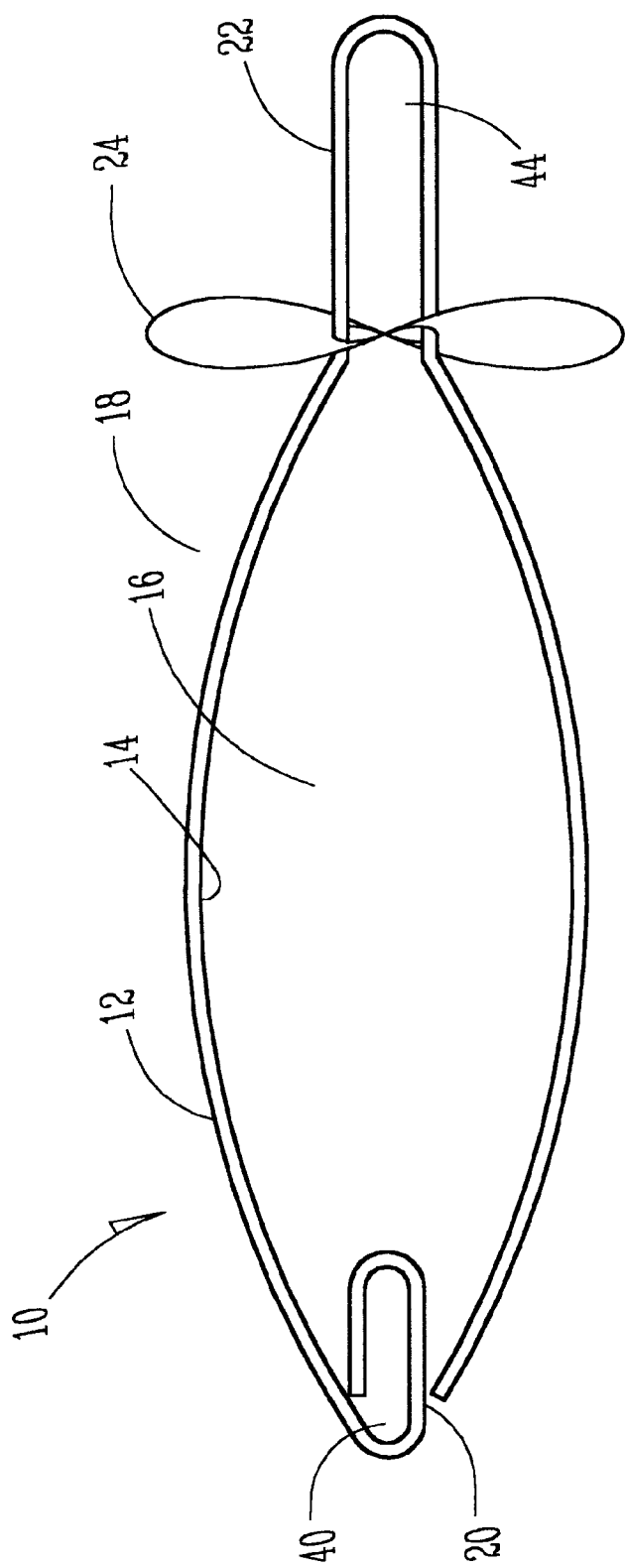
FIG. 1 is a side view of a fishing lure embodying the present invention showing a frame and a propeller-like member.

Referring now to FIG. 1, a fishing lure of the present invention is shown generally at 10. The lure is a generally two-dimensional wire-like frame 12 bounding an elliptically shaped opening 14 with an interior 16 and an exterior 18 and further comprising an eye portion 20 and a tail portion 22. In the preferred embodiment, said eye portion 20 is located in said interior 16 of said opening and comprises a loop 40; said tail portion 22 is located exterior 18 of said opening 14 and comprises an aperture 44. Associated with said tail portion 22 is a propeller-like member 24.

The loop 40 in said eye portion 20 and the aperture 44 in said tail portion 22 provide attachment places for a first hook 50 with means to attach to said eye portion 52 and a second hook 54 with means to attach to said tail portion 56. In other embodiments of the present invention said second hook 54 is accompanied by a skirt or other fish attractant.

Figures 2, 3:
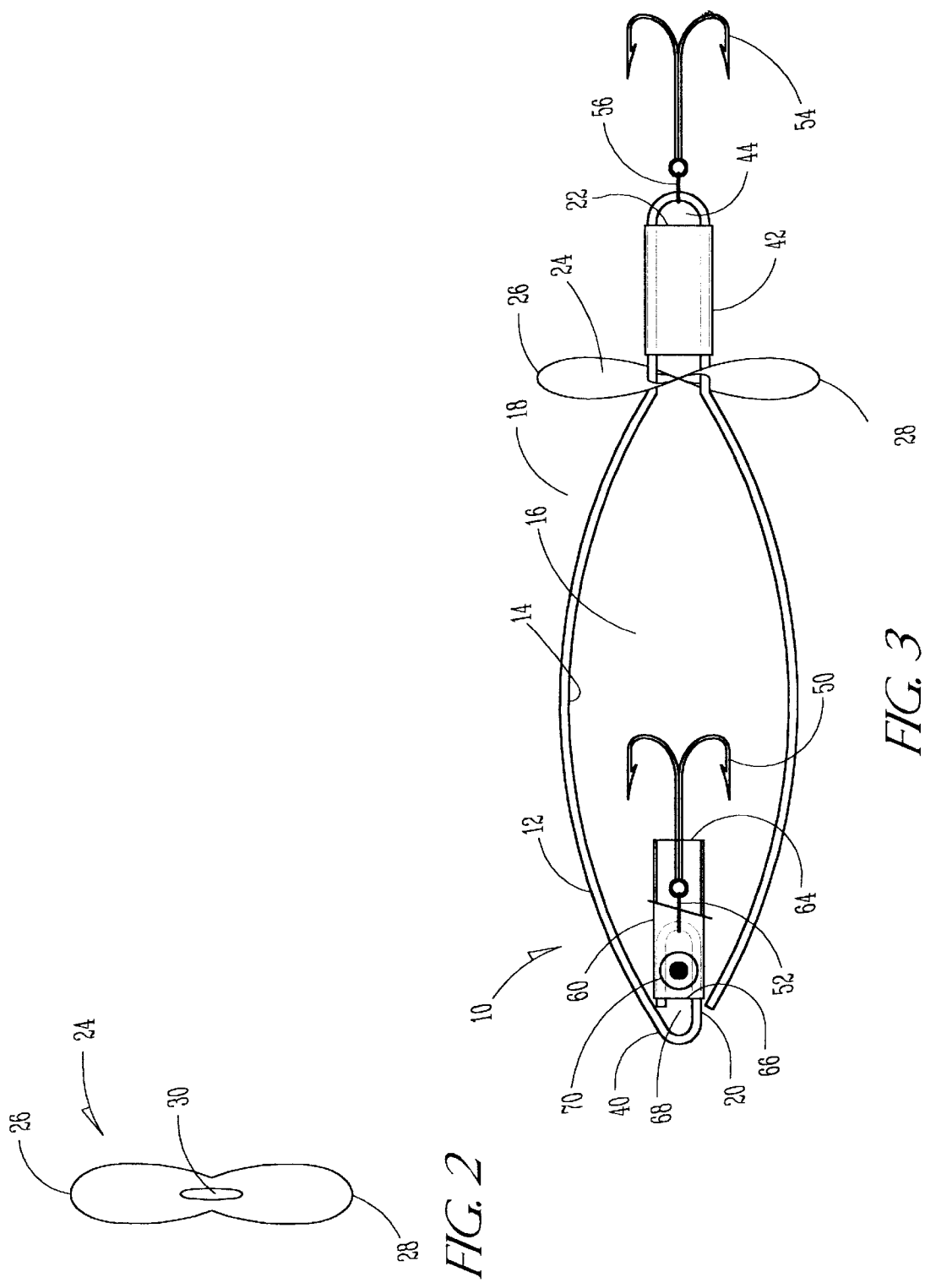
FIG. 2 is an enlarged, front view of the propeller-like member shown in FIG. 1.
FIG. 3 is a cut-away, side view of the fishing lure of the present invention.

As best shown in FIG. 2, the propeller-like member 24 comprises a rounded first end 26, a rounded second end 28, and a central opening 30 in said propeller-like member 24. In the preferred embodiment, said propeller-like member 24 is associated with said tail portion 22 when said tail portion 22 is threaded through said central opening 30.

The fishing lure 10 of the preferred embodiment includes means to secure said propeller-like member 42 to said tail portion 22. Referring to FIG. 3, said means to secure said propeller-like member 42 to said tail portion 22 comprises a tube-like element made of elastic flexible material which fits over said tail portion 22. Said propeller-like member 24 is threaded on said tail portion 22 then said tube-like element 42 is threaded on said tail portion leaving said aperture 44 in said tail portion 22 open. Said means to attach said second hook 56 is then used to secure said second hook 54 to said aperture 44 in said tail portion 22.

Still referring to FIG. 3, the preferred embodiment also comprises a flexible sleeve 60 with a first end 64 and a second end 66 and which fits around said eye portion 20. In assembly, said means to attach said first hook 52 is used to secure said first hook 50 to said loop 40 in said eye portion 20 and then said flexible sleeve 60 is applied such that said first hook 50 is stabilized in position by said first end 64 of said sleeve 60 and a portion of said loop 68 is left open past said second end 66 of said flexible sleeve 60. The open portion of said loop 68 can be used to secure a fishing line. Upon the flexible sleeve 60 is affixed at least one artificial eye 70.

In the preferred embodiment the wire-like frame is made of a single piece of spring metal which provides simple and inexpensive construction as well as enables the lure to regain its shape even after a strong strike or after becoming entangled after casting. In the preferred embodiment, the eye portion is positioned interior of said elliptical opening and the tail exterior to said opening, in this manner, the lure provides the natural profile of prey without added appendages or unexpected angles. Finally, the propeller-like member provides a means to spin said lure as it is retrieved through the water.

Thus, the present invention has been described in an illustrative manner. It is to be understood that the terminology that has been used is intended to be in the nature of words of description rather than of limitation.

Many modifications and variations of the present invention are possible in light of the above teachings. For example, attached to the first and second hooks could be one of many different fish attractants known in the art; an artificial eye could be simply constructed as a two-dimensional stick-on or as a jewel-like three-dimensional eye piece. The propeller-like member could be enlarged so that the lure will splash as it is retrieved across the surface of the water. Therefore, within the scope of the appended claims, the present invention may be practiced otherwise than as specifically described.

I claim:

1. A fishing lure comprising:
   (a) a generally two-dimensional wire-like frame bounding at least one opening generally elliptical in shape and enclosing at least one loop comprising an eye portion located interior to said at least one opening and a tail portion;
   (b) a propeller-like member; and
   (d) said tail portion comprising means to secure said propeller-like member and an aperture.

2. A fishing lure as claimed in claim 1 further comprising a first hook including means to attach said hook to said at least one loop in said eye portion.

3. A fishing lure as claimed in claim 2 further comprising:
   (a) a central opening in said propeller-like member and said tail portion threaded through said central opening in said propeller-like member;
   (b) a second hook with means to attach said second hook to said aperture in said tail portion; and
   (c) said means to secure said propeller-like member comprises a tube-like element positioned between said propeller-like member and said hook.

4. A fishing lure as claimed in claim 3 wherein said eye portion is substantially covered by a flexible sleeve for providing semi-flexible stability to said first hook, and at least one artificial eye is adhered to said sleeve.

5. A fishing lure comprising:
   (a) a substantially two-dimensional frame shaped generally like a fish with a body portion bounding a first opening of size and shape only slightly smaller than said body portion;
   (b) an eye portion bounding at least one loop and positioned inside said body portion;
   (c) a tail portion positioned exteriorly to said body portion and opposite said eye portion and comprising a means to attach a fish attractant;
   (d) a propeller-like member with means to associate said propeller-like member with said tail portion; and
   (e) said tail portion further comprising a means to secure said propeller-like member; and
   wherein said eye portion further comprises:
      a first loop and a second loop,
      a hook attached to said second loop,
      a flexible sleeve substantially covering said eye portion, and
      at least one artificial eye affixed to said flexible sleeve to resemble live prey.

6. A fishing lure as claimed in claim 5 wherein said propeller-like member comprises a relatively two-dimensional piece of metal with a rounded first end and a rounded second end causing said lure to spin while retrieved and with an opening between said first and second ends through which said tail portion is threaded such that said two-dimensional propeller-like member is generally perpendicular to said frame.

7. A fishing lure as claimed in claim 6 wherein said means to secure said propeller-like member to said tail comprises a tube-like element positioned between said propeller-like member and said means to attach said fish attractant.

8. A fishing lure as claimed in claim 7 wherein said means to attach said fish attractant comprises a loop.

9. A fishing lure comprising:
   (a) a substantially two-dimensional frame shaped generally like a fish with a body portion said body portion bounding a first opening of size and shape only slightly smaller than said body portion with an exterior and an interior;
   (b) an eye portion bounding at least one loop and positioned interior of said body portion, a flexible sleeve substantially covering said eye portion and at least one artificial eye affixed to said flexible sleeve to resemble live prey;
   (c) a tail portion positioned exteriorly to said body portion and opposite said eye portion and comprising a means to attach a fish attractant;
   (d) a generally two-dimensional propeller-like member with means to associate said propeller-like member with said tail portion said means further comprising an aperture in said propeller-like member through which said tail portion is threaded; and (e) said tail portion further comprising a tube-like element positioned between said propeller-like member and said means to attach said fish attractant.

10. A fishing lure as claimed in claim 9 further comprising a hook with means to attach said hook to said at least one loop on said eye portion.

11. A fishing lure as claimed in claim 9 wherein said fish attractant comprises a skirt.

12. A fishing lure as claimed in claim 9 herein said frame comprises a resilient wire.

13. A fishing lure as claimed in claim 9 wherein said body portion, said eye portion and said tail portion are comprised of one, continuous portion of wire.

14. A fishing lure comprising:

(a) a generally two-dimensional wire-like frame bounding at least one opening generally elliptical in shape and comprising an eye portion located interior to said opening and a tail portion;

(b) a propeller-like member;

(c) said eye portion comprising at least one loop for attaching a fishing line;

(d) a first hook including means to attach said hook to said at least one loop in said eye portion;

(e) said eye portion is substantially covered by a flexible sleeve for providing semi-flexible stability to said first hook;

(f) said tail portion comprising means to secure said propeller-like member and an aperture; and (g) a second hook with means to attach said second hook to said aperture in said tail portion.

* * * * *